United States Patent [19]

Klein

[11] 4,224,956
[45] Sep. 30, 1980

[54] ADJUSTABLE PROPORTIONING VALVE

[76] Inventor: Richard F. Klein, 20911 Via Verde, Covina, Calif. 91722

[21] Appl. No.: 958,244

[22] Filed: Nov. 6, 1978

Related U.S. Application Data

[63] Continuation-in-part of Ser. No. 774,594, Mar. 7, 1977, abandoned.

[51] Int. Cl.³ ............................................. G05D 11/03
[52] U.S. Cl. ...................................... 137/114; 169/14
[58] Field of Search ................... 137/98, 114; 169/14, 169/15, 44; 251/285; 417/184, 191

[56] References Cited

U.S. PATENT DOCUMENTS

| 2,682,883 | 7/1954 | Phillips | 137/98 X |
| 2,751,920 | 6/1956 | Kanelos | 137/98 |
| 3,141,471 | 7/1964 | Williamson | 137/114 |

Primary Examiner—Robert G. Nilson
Attorney, Agent, or Firm—Albert L. Gabriel

[57] ABSTRACT

A fluid proportioning valve adjustable to provide a plurality of specific predetermined fluid proportions. To adjust the valve for one of the predetermined fluid proportions, the extent of displacement of a flow displaced proportioning piston is preselected by engagement of an adjustable stop member in one of a plurality of specific stop positions.

40 Claims, 17 Drawing Figures

ADJUSTABLE PROPORTIONING VALVE

RELATED APPLICATIONS

This is a continuation-in-part of my co-pending application Ser. No. 774,594, filed Mar. 7, 1977, for ADJUSTABLE PROPORTIONING VALVE, now abandoned.

BACKGROUND OF THE INVENTION

1. Field of the Invention

The invention is in the field of mixing valves for mixing a plurality of fluids in predetermined proportions.

2. Description of the Prior Art

In some fluid applications it is required that two separate fluids be mixed immediately prior to the application. An example of this is in fire fighting vehicles where a fire retardant liquid such as "Light Water" or protein foam is mixed in small proportion with water immediately prior to being sprayed or jetted into a fire. In such mixtures the fluid proportioning is generally required to be quite accurate for optimum effectiveness, and in an endeavor to provide accurate proportioning of the ingredients it is common practice in the art to employ a mixing valve into which both fluids flow and which is designed to mix the fluids in a given proportion.

The type of mixing valve conventionally employed in fire fighting equipment embodies a spring biased piston wherein the extent of displacement of the piston increases according to the volume of flow through the mainstream, increased piston displacement allowing a greater amount of the fire retardant material to flow into the mainstream. A serious disadvantage of this type of mixing valve is that it is inherently limited to only a single percentage mixture of the liquid ingredients, so that only one weight or density of fire retardant material can be used in the equipment. Fire retardant liquids are made by several different companies, but each of these liquids has a different weight or density, whereby fire fighting equipment employing a conventional mixing valve is limited to use of only a specific brand of fire retardant material. Specifically, the fire retardant liquids produced by the different manufacturers are adapted for either a 3%, a 6%, or a 10% mixture with water, and with conventional mixing valves each of these percentage mixtures requires a different mixing valve to produce the required proportioning.

While a variety of adjustable mixing valves is found in the prior art, none of these is adaptable for adjustment to specific predetermined percentage increments of proportioning where each of the predetermined percentages will remain substantially fixed regardless of wide variations in the mainstream flow volume. Also, such prior art mixing valves tend to be undesirably complex and expensive, and generally are not suitable or reliable for handling the large flow volumes that are required in fire fighting equipment.

Examples of some of these prior art adjustable mixing valves are found in Sanderson et al U.S. Pat. No. 3,934,604 which discloses a mixing valve where an eccentric is used to adjust mixing proportions by adjusting orifice size; Hirst et al Patent No. 2,480,925 which discloses a mixing valve where primary proportioning is accomplished by lever rotation of a piston assembly, and where the piston is also rotated by camming action as it is displaced so that proportioning adjustment is a function of flow rate; and Kanelos U.S. Pat. No. 2,751,920, Chaffee U.S. Pat. No. 2,471,142 and Lindsay U.S. Pat. No. 3,647,002, all of which disclose mixing valves which employ adjusting screws for gradually varying the amount of displacement of a valve member.

SUMMARY OF THE INVENTION

In view of these and other problems in the art, it is an object of the present invention to provide a fluid proportioning valve which is conveniently adjustable to provide a plurality of different specific fluid proportions.

Another object of the invention is to provide an adjustable fluid proportioning valve for mixing primary and secondary fluids in any one of a plurality of predetermined percentage mixture increments.

Another object of the invention is to provide an adjustable proportioning valve for providing a plurality of specific selectable fluid proportions, wherein each selected proportion remains substantially the same regardless of wide variations in the mainstream flow volume.

It is another object of the invention to provide an adjustable proportioning valve of the character described which is simple in construction, employing only a single movable valve element, yet which is capable of providing an accurate percentage mixture of the fluids in any one of a plurality of different predetermined percentages.

A further object of the invention is to provide an adjustable proportioning valve that is suitable for mobile fire fighting equipment, and is adapted for providing a correct mixture of a fire retardant material with water regardless of variations in the weight or density of the fire retardant material.

A still further object of the invention is to provide an adjustable proportioning valve for mixing a secondary fluid with a primary fluid wherein the proportion of secondary fluid to primary fluid is determined by the extent of displacement of a flow displaced piston having an integral sleeve valve.

Yet a further object of the invention is to provide an adjustable proportioning valve of the character described wherein the extent of displacement of the flow displaced proportioning piston is preselected by positioning an adjustable stop member in one of a plurality of specific stop positions.

In one form of the invention the stop member is a pin which is threadedly engageable in any one of a series of mounting holes in the piston, the pin extending through a slot in a piston slide support, one end of the slot providing stop shoulder means which limits the extent of travel of the pin and hence of the piston. In other forms of the invention a threaded pin is adjustable so as to be selectively engageable by any one of a series of stepped stop shoulders forming stop shoulder means on the piston.

The invention comprises a tubular valve body connectable in the mainstream of flow of a primary fluid, with a flow displaceable piston having a tubular stem slidable in a tubular slide support in the body. One or more secondary fluid conduits enter the body from the side and terminate at ports opening at the inner surface of the slide support tube. The tubular piston stem has apertures through the wall thereof, and the piston is lightly biased by a spring toward the upstream direction to a closed, unactuated position of the valve wherein the stem closes off the secondary fluid side ports. Mainstream fluid flow through the valve body shifts the piston to a preselected actuated position wherein the piston is stopped with its tubular stem apertures registering with the secondary fluid ports to enable secondary fluid to flow into the hollow piston stem and thence through the open downstream end of the stem for mixing with the primary fluid passing through the valve body. The extent of travel of the piston to the stop position determines the extent of registry of the stem apertures with the secondary fluid ports and hence the percentage mixture of secondary fluid with primary fluid. The stop position of the piston is determined by the position of an adjustable stop member that is mounted on either the piston or the valve body, the stop member being adjustable to any one of a plurality of specific stop positions which cause the piston to stop at respective discrete predetermined positions.

In one form of the invention the stop position of the piston is determined by the position of a stop pin on the piston stem, the pin being threadedly engageable in any one of a plurality of axially spaced, threaded holes in the stem, the pin extending out through a slot in the slide support so as to be engageable against stop shoulder means at one end of the slot, and the pin being accessible for adjustment to different ones of the threaded holes through a normally covered access port in the wall of the body. In another form of the invention these axially spaced, threaded holes in the stem are replaced by a plurality of axially spaced, radially stepped shoulders on the piston stem, and an externally accessible stop pin is adjustably mounted on the access port cover and is radially adjustable between a plurality of specific stop positions at which it is engaged by the respective shoulders on the stem. In a still further form of the invention a similar plurality of stepped shoulders is disposed on the piston proximate its head, and the externally accessible stop pin is mounted so as to extend through the wall of the valve body.

BRIEF DESCRIPTION OF THE DRAWINGS

These and other objects of the invention will become more apparent in reference to the following description and the accompanying drawings, wherein.

DETAILED DESCRIPTION

Figures 1, 2, 3:
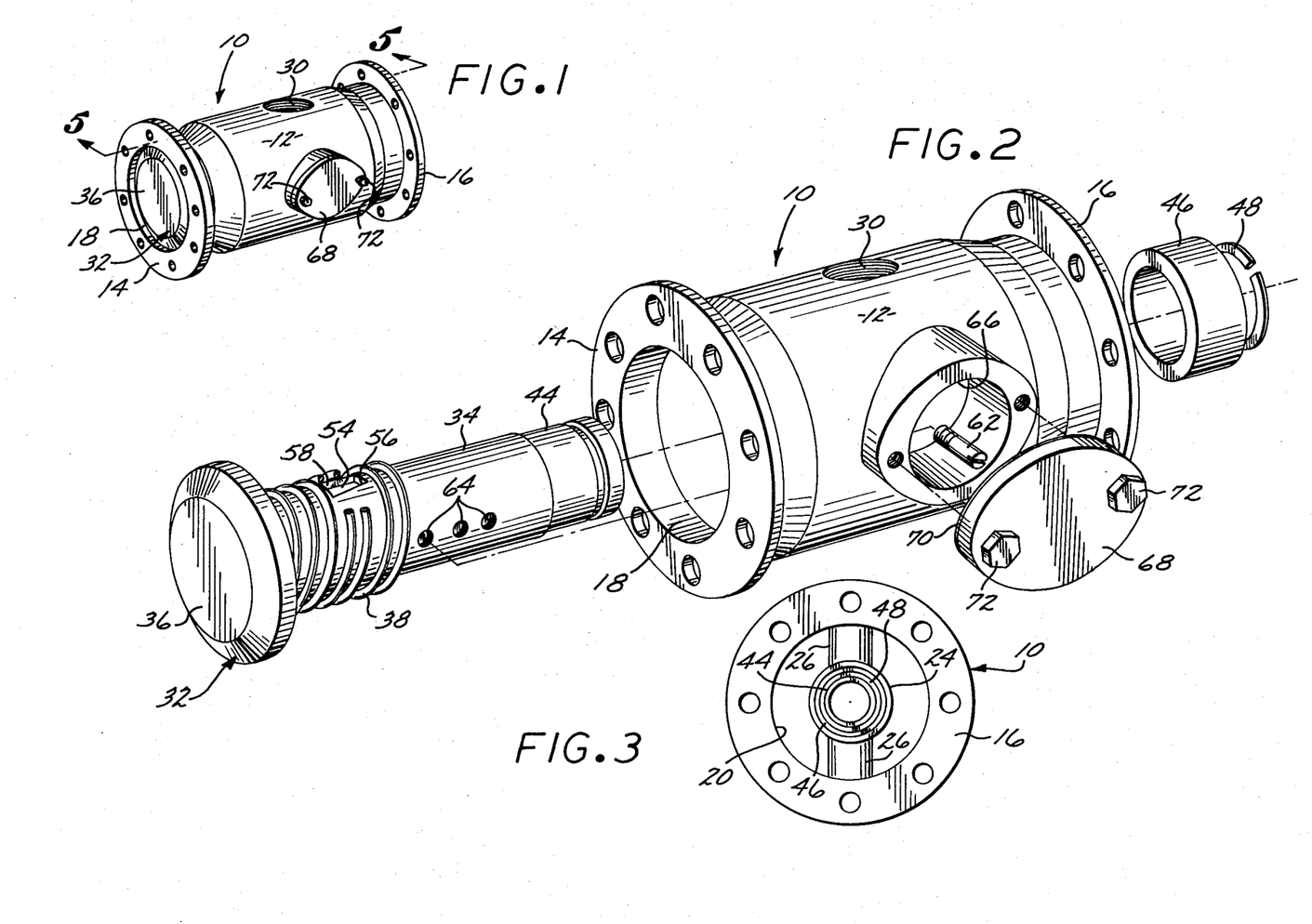
FIG. 1 is a perspective view showing one form of adjustable proportioning valve according to the invention.
FIG. 2 is an exploded perspective view of the valve shown in FIG. 1.
FIG. 3 is an end elevational view of the downstream end of the valve shown in FIGS. 1 and 2, which is the right-hand end of the valve as shown in FIG. 1.
Figures 4, 5, 6, 7, 8, 9:
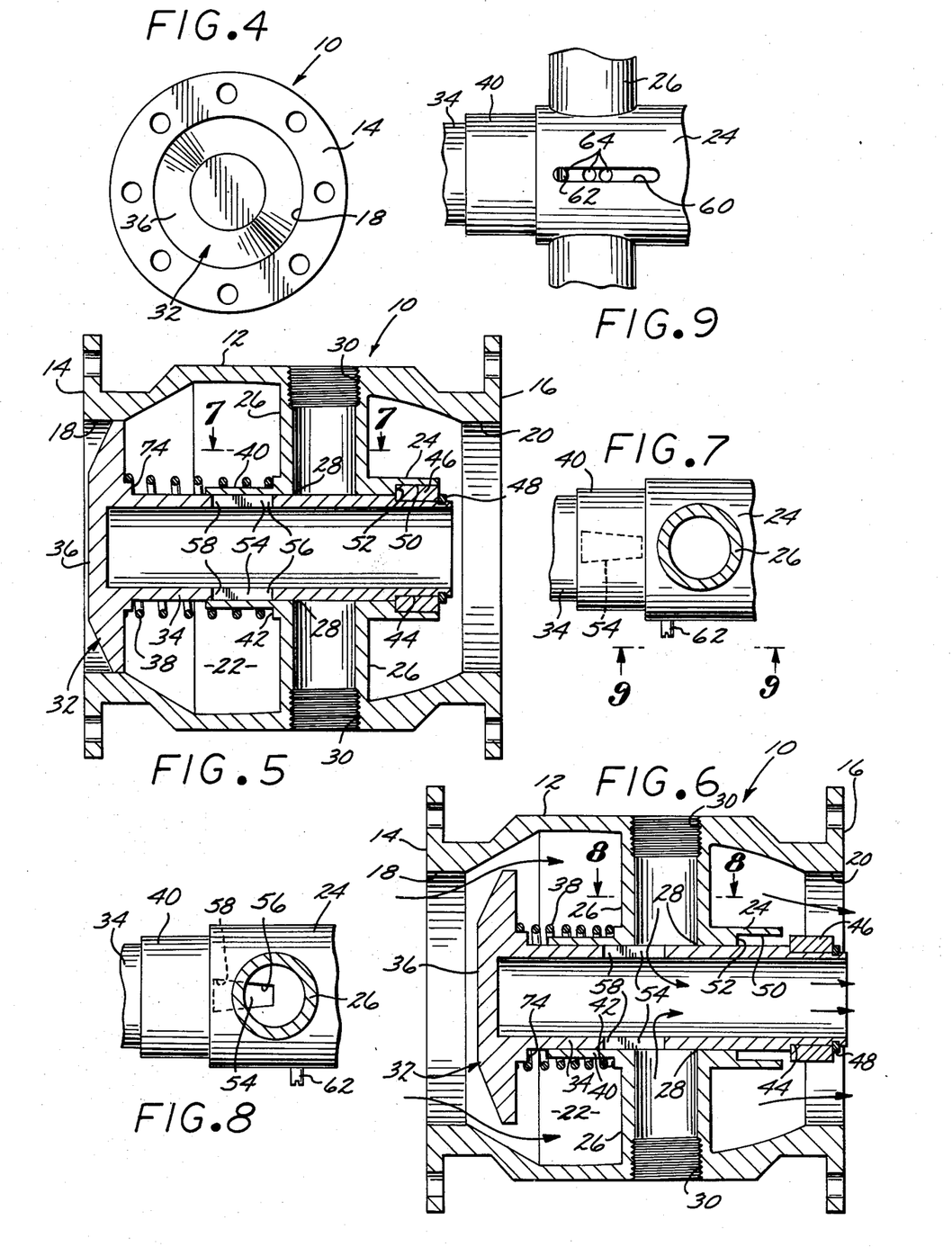
FIG. 4 is an end elevational view of the upstream end of the valve shown in FIGS. 1-3, which is the left-hand end of the valve as shown in FIG. 1.
FIG. 5 is an axial section taken on the line 5—5 in FIG. 1 showing the valve in its unactuated, closed position.
FIG. 6 is an axial sectional view similar to FIG. 5, but showing the valve in an actuated, open position.
FIG. 7 is a fragmentary sectional view taken on the line 7—7 in FIG. 5.
FIG. 8 is a fragmentary sectional view taken on the line 8—8 in FIG. 6.
FIG. 9 is a fragmentary elevational view taken on the line 9—9 in FIG. 7.

Referring to the drawings, and at first particularly to FIGS. 1 and 5 thereof, the form of adjustable proportioning valve shown in these Figures is generally designated 10, and includes a valve body 12 in the form of a generally cylindrical casing. Valve body 12 includes annular, flanged inlet and outlet 14 and 16, respectively, which are suitable for coupling the valve 10 in the mainstream of flow of a primary fluid. Valve body 12 defines a cylindrical inlet port 18 at inlet end 14 for receiving the primary fluid inlet flow, the inlet port 18 forming a check valve seat adapted to cooperate with the valve piston head as described in detail hereinafter. An annular fluid outlet port 20 as defined within the outlet end 16 of body 12.

Intermediate the inlet port 18 and the outlet port 20 the valve body 12 defines an annular valve chamber 22 of substantially greater diameter than the inlet port 18, the inner surface of body 12 flaring outwardly from inlet port 18 to a central portion which is generally cylindrical, and then tapering back inwardly to the outlet port 20. Coaxially positioned within valve body 12 is a cylindrical piston slide support 24 which is supported by a pair of radially oriented, diametrically opposed secondary fluid inlet tubes 26 which extend between the cylindrical slide support 24 and the valve body 12. If desired, the body 12, secondary fluid inlet tubes 26 and slide support 24 may all be portions of a single casting.

The secondary fluid inlet tubes 26 open out into the inside of the cylindrical slide support 24 at secondary fluid ports 28. At their outer ends, the secondary fluid inlet tubes 26 open out through the wall of the valve body 12 and are provided with suitable coupling means such as internal threads 30 for connection with a pair of secondary fluid supply conduits (not shown).

The valve 10 has a single movable element in the form of an axially slidable piston 32 which includes a tubular stem 34 axially slidably engaged in the slide support 24, and a piston head 36 which slidably seats within the inlet port 18 in the unactuated condition of the valve. The piston head 36 also serves to close off the upstream end of the hollow piston stem 34. Piston 32 is lightly biased toward the inlet end 14 of valve body 12 (to the left in FIG. 5) by means of a helical spring 38. The spring 38 is axially located relative to piston 32 by being loosely engaged over a reduced portion 40 of slide support 24, the spring 38 being operatively compressively engaged at its ends between a shoulder 42 on slide support 24 and the piston head 36.

The downstream or outlet end portion of tubular piston stem 34 has an outer reduced diameter portion 44 over which a snubber sleeve 46 (which may be made of plastic or other cushioning material) is engaged. The snubber sleeve 46 is retained on stem 34 by means of a snap ring 48 engaged in a suitable groove in the reduced diameter end portion 44 of stem 34. The inside of slide support 24 is stepped outwardly in the downstream or outlet end portion of slide support 24 to provide an annular recess 50 and a downstream-facing annular shoulder 52. The snubber sleeve 46 is freely slidable within the annular recess 50, and engagement of snubber sleeve against shoulder 52 defines the upstream limit of movement of piston 32 which is the unactuated or closed position of the valve as shown in FIG. 5.

A pair of diametrically opposed apertures 54 is provided through the wall of tubular piston stem 34 in axial alignment with the respective diametrically opposed secondary fluid ports 28 in slide support 24. As best seen in FIGS. 5 and 7, in the unactuated or rest position of the valve, the apertures 54 register with the solid cylindrical wall portion of slide support 24 upstream or to the left of secondary fluid ports 28, so that the piston stem provides a complete closure of secondary fluid ports 28 against any flow of the secondary fluid through the valve 10. However, upon the application of a fluid pressure differential across the valve (either pump pressure upstream of the valve or pump suction downstream of the valve), the piston 32 will be caused to slidably shift in the downstream direction or to the right as viewed in FIGS. 5 and 8, and the apertures 54 will be brought into registry with the secondary fluid ports 28 as seen in FIGS. 6 and 8 which will allow the flow of secondary fluid from inlet tubes 26 through ports 28 and the respective apertures 54 into the hollow center of piston stem 34, the secondary fluid then flowing out of the valve through the open downstream end of the tubular stem 34.

As best seen in FIG. 6, when the piston 32 is shifted to the right or downstream against the weak biasing force of spring 38 by a pressure differential across the valve, the piston head 36 becomes unseated from primary inlet port 18, and the enlarged diameter of the valve chamber 22 allows the primary fluid to flow outwardly around the piston head 36 and thence downstream through the valve chamber 22 past the secondary fluid inlet tubes 26 and out of the outlet end 16 of valve body 12 through an annulus defined between valve body outlet port 20 and the downstream end of piston stem 34. The outlet flow of primary fluid through this annulus creates a venturi action which draws the secondary fluid from the secondary fluid inlet tubes 26 through ports 28 and apertures 54 and thence out through the open downstream end of tubular stem 34 where the secondary fluid is introduced into and mixed with the primary fluid.

When the fluid pressure differential is relieved from across the valve the spring 38 will automatically return piston 32 to the closed position of the valve as shown in FIGS. 5 and 7 in which the secondary fluid ports 28 are closed off by tubular stem 34, and in which the piston head 36 is seated in body inlet port 18 to provide a check valve function against reverse flow of fluid through the valve 10.

Referring now particularly to FIGS. 2, 7, 8 and 9 of the drawings, an important aspect of this form of the present invention is adjustable pin and slot means for adjusting the axial extent of displacement of the piston 32, and hence adjusting the extent of registry of the valve stem apertures 54 with the secondary fluid ports 28, when the valve is actuated by a flow of primary fluid therethrough. This pin and slot adjusting means includes an elongated, axially directed slot 60 in the fixed slide support 24 which cooperates with a displacement limiting pin 62 that is adjustable by being removably mountable in any one of a plurality of axially spaced pin mounting holes 64 in the outside of the wall of tubular stem 34. The pin is in the form of a screw, with an externally threaded inner end and a slotted outer end for receiving a driver tool, and each of the pin mounting holes 64 is internally threaded for engagement of the pin therein. The pin mounting holes 64 do not extend all of the way through the wall of the tubular stem 34 to avoid leakage of the primary fluid from the valve chamber 22 into the interior of the tubular stem 34.

Any desired number of the pin mounting holes may be provided in tubular stem 34 according to the desired number of different secondary/primary fluid mixture proportions that are to be pre-selectable. In the illustrated embodiment of the invention there are three axially spaced pin mounting holes 64 for three different pin positions, each of which will provide a different secondary/primary fluid mixture proportion. With the pin mounted as shown in FIG. 9 in the left-hand or upstream-most hole 64, the piston 32 will have a maximum amount of displacement in operation to provide the greatest percentage mixture of secondary fluid to primary fluid; with the pin mounted in the intermediate hole 64 the piston displacement will be an intermediate amount so as to produce an intermediate percentage mixture of secondary fluid to primary fluid; while with the pin mounted in the right-hand or downstream-most hole 64 a minimum percentage mixture of secondary fluid to primary fluid will be provided. As is best seen in FIG. 9, the extent of axial displacement of the piston is determined by bottoming of the pin 62 against the shoulder formed by the right-hand or downstream end of the slot 60.

The pin mounting holes 64 are preferably all axially aligned with each other, and the holes 64 and slot 60 are peripherally displaced in stem 34 and slide support 24, respectively, from the apertures 54 and secondary fluid inlet tubes 26, respectively, this peripheral displacement preferably being 90° as shown in the drawings. It is to be noted that engagement of the displacement limiting pin 62 in the axially directed slot 60 serves the further function of retaining the piston 32 in a fixed rotational position relative to the piston slide support 24.

As best seen in FIGS. 1 and 2, access is provided through the outer wall of the valve body 12 for shifting the displacement limiting pin 62 from one pin mounting hole 64 to another through pin access port 66 which registers generally with the positions of the pin mounting holes 64 in the unactuated condition of the valve, the pin access port 66 being sufficiently large to permit pin 62 to be easily unscrewed out of any one of the mounting holes 64 and screwed back into any of the other mounting holes 64. Pin access port 66 is normally covered and sealed by means of a cover 68 and gasket 70 adapted to be clamped over the port 66 by bolts 72 or other suitable fastening means.

Although the adjustable proportioning valve 10 may be employed for the mixing of any two fluids in an adjustably predetermined proportion, an example of a particular use for which the valve 10 of the present invention has been found suitable is for the mixing of a fire retardant liquid such as "Light Water" or protein foam as a secondary fluid with water as a primary fluid in fire fighting vehicles. In this usage the adjustable proportioning valve 10 will normally be disposed on the suction side of a pump, although if desired the valve may be disposed on the pressure side of the pump. The valve body 12 is made sufficiently large so that the internal clearances are sufficiently large to accommodate full pump flow in any of the selectable valve displacement positions. The piston return spring 38 is a sufficiently weak spring so that with any amount of pump flow the displacement limiting pin 62 will always bottom out in the downstream end of the slot 60 and the piston will at all times during pump flow remain fixed in its preselected proportioning position. For this or any other use of the adjustable proportioning valve 10, it is to be understood that the maximum piston displacement position, corresponding to the greatest percentage mixture of secondary fluid to primary fluid, may be determined either by engagement of the displacement limiting pin 62 against the downstream end of slot 60 or engagement of a shoulder 74 on tubular stem 34 against the upstream end of piston slide support 24.

The adjustable proportioning feature of the valve 10 enables the valve to be quickly and easily adapted for use of fire fighting apparatus with fire retardant materials of different weights or strengths. Thus, currently different manufacturers of fire retardant materials produce these materials in different weights which are adapted for 3%, 6% and 10% mixtures, and conventional fire fighting apparatus permitted only one of these fire retardant materials to be used, since no proportioning adjustment was possible. However, with the form of the present invention shown in FIGS. 1–9, three different pin positions may be provided corresponding to the 3%, 6% and 10% mixtures, respectively, so that any one of the three different weight fire retardant materials may be employed as desired.

Although any desired configuration of the apertures 54 may be provided within the scope of the invention, it will be noted from FIGS. 2, 7 and 8 that the illustrated configuration of the apertures 54 is elongated in the axial direction of the valve, and tapered from relatively narrow leading or downstream end portions 56 to relatively wide trailing or upstream end portions 58. This illustrated elongated, tapered configuration for the apertures 54 in combination with the spacing of the pin mounting holes 64 as illustrated in FIGS. 2 and 9 is adapted to produce 3%, 6% and 10% secondary/primary fluid mixtures.

FIGS. 10–13 of the drawings illustrate a form of the present invention wherein the adjustment means is externally accessible for selecting any one of a series of predetermined mixing proportions for the primary and secondary fluids which pass through the valve. This enables the mixing proportions to be changed from one discrete percentage to another without requiring the removal of a cover from the valve body and subsequent replacement thereof, and consequently without loss of fluid from within the valve body.

The adjustable proportioning valve that is illustrated in FIGS. 10–13 is generally designated 10a, and it includes a valve body 12a which may be the same in construction as the valve body 12 in the form of the invention shown in FIGS. 1–9. Thus, valve body 12a includes inlet port 18a, outlet port 20a, annular valve chamber 22a, and cylindrical piston slide support 24a which is coaxially mounted within valve body 12a by means of the radially directed secondary fluid inlet tubes 26a.

Figures 10, 11, 12, 13:
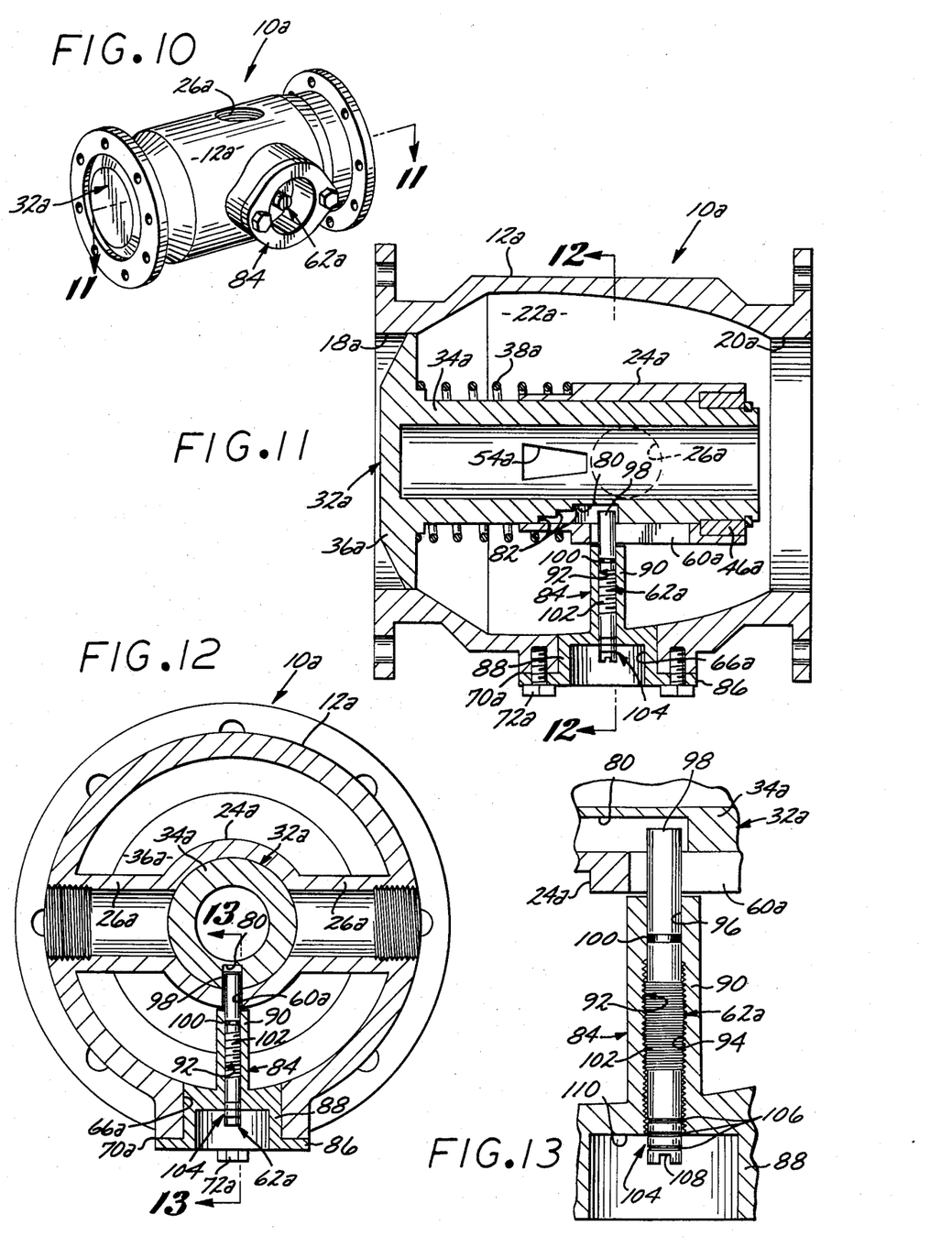
FIG. 10 is a perspective view similar to FIG. 1, but showing another form of adjustable proportioning valve according to the invention.
FIG. 11 is an axial section taken on the line 11—11 in FIG. 10.
FIG. 12 is a transverse section taken on the line 12—12 in FIG. 11.
FIG. 13 is an enlarged, fragmentary sectional view taken on the line 13—13 in FIG. 12.

Valve piston 32a includes tubular stem 34a which is coaxially slidably mounted within slide support 24a. The construction of piston 32a may be the same as that of the piston 32 in the form of the invention shown in FIGS. 1–9, except that the pin mounting holes 64 of piston 32 are replaced in piston 32a by a longitudinally arranged recess or slot having a series of stepped shoulders therein. Thus, as best seen in FIG. 11, and also shown in FIGS. 12 and 13, outwardly facing, longitudinally arranged recess 80 is provided in the valve stem 34a. Longitudinal recess 80 is generally similarly positioned in the stem 34a as are the pin mounting holes 64 in the stem 34 of the form of valve shown in FIGS. 1–9. Thus, the longitudinal recess 80 is peripherally displaced in stem 34a from the tapered apertures 54a in stem 34a and secondary fluid inlet tubes 26a, this peripheral displacement preferably being 90° as shown in the drawings. This places the longitudinal recess 80 in registry peripherally with the longitudinal slot 60a that extends through the wall of the cylindrical piston slide support 24a. Longitudinal recess 80 in stem 34a has a series of stepped stop shoulders 82 therein, the shoulders 82 facing in the downstream direction of the valve, and having their surfaces radially oriented. Thus, the deepest portion of recess 80 is the downstream end portion, and with each of the shoulders 82 the recess 80 becomes successively shallower.

The piston 32a includes piston head 36a, and piston 32a is lightly biased toward its closed position as shown in FIG. 11 with head 36a seated in inlet port 18a by means of helical spring 38a that is engaged between piston head 36a and slide support 24a. The upstream limit of movement of piston 32a is defined by engagement of snubber sleeve 46a on piston stem 34a against slide support 24a.

Each of a series of discrete stop positions of the piston 32a in the valve body 12a is determined by engagement of a respective one of the stop shoulders 82 on piston stem 34a against an adjustable stop pin 62a that is supported on the valve body 12a. Adjustable stop pin 62a is mounted in stop pin support structure generally designated 84 which is mounted in valve body port 66a and replaces the port cover 68 employed in the form of the invention shown in FIGS. 1–9. The port 66a is peripherally in registry with the longitudinal slot 60a in slide support 24a and with the shouldered longitudinal recess 80 in piston stem 34a. Stop pin support structure 84 includes an external flange 86, a cupped portion 88 which extends inwardly through the port 66a and is preferably generally radially coextensive with the port 66a, and then a reduced neck portion 90 which extends radially inwardly through the annular valve chamber 22a and terminates at an inner end which is adjacent slide support 24a and radially aligned with the longitudinal slot 60a. Radially oriented bore 92 extends through the reduced neck 90, and includes an outer threaded portion 94 and an inner smooth sealing portion 96. A gasket 70a is disposed between the flange 86 of support structure 84 and valve body 12a, and support structure 84 is secured in its operative position by means of bolts 72a.

Adjustable stop pin 62a is mounted in bore 92 of stop pin support structure 84, the stop pin 62a having an inner end portion 98 which extends through slot 60a and into the shouldered recess 80 on piston stem 34a. Stop pin 62a also includes a sealing portion having a sealing ring 100 thereon located in the smooth sealing portion 96 of bore 92, and a threaded portion 102 threadedly engaged in the outer threaded portion 94 of bore 92. Adjustable stop pin 62a also includes an external indexing portion 104 which has spaced annular indexing grooves 106 or other suitable indexing rings or marks. The adjustable stop pin 62a terminates at its outer end with a slot 108 or other suitable torquing means which is externally accessible to a suitable driver tool so that the stop pin 62a can be threadedly moved radially inwardly or outwardly as desired.

Preferably, the external portions of the stop pin 62a are entirely recessed within the cupped portion 88 of pin support structure 84, for protection of the pin 62a.

Three of the stepped stop shoulders 82 are shown in FIG. 11 of the drawings, although it is to be understood that any desired number of the stepped stop shoulders may be provided in accordance with the invention, depending upon how many discrete stop positions are desired for the piston 32a. The same number of indexing marks 106 is provided on the stop pin 62a as the number of stepped stop shoulders 82. Each of the indexing grooves or marks 106 is arranged on the stop pin 62a so that when the groove or mark 106 is proximate the exposed surface 110 at the bottom of the support structure cup 88 it will index a radial position of the stop pin 62a at which the pin 62a will be engaged by a respective one of the stepped shoulders 82 on piston seem 34a. Thus, when the outermost indexing groove or mark 106 registers with cup surface 110, the stop pin 62a is at an innermost position wherein it will be engaged by the first stop shoulder 82; when the stop pin 62a is shifted outwardly to the position illustrated in FIGS. 11, 12 and 13 where the second indexing groove or mark 106 registers with the surface 110, the stop pin 62a is radially positioned so as to be missed by the first stop shoulder 82 and engaged by the second stop shoulder 82; and when the stop pin 62a is moved further radially outwardly so that the third or innermost indexing ring or mark 106 registers with the surface 110, then the stop pin 62a is radially positioned so that both the first and second stop shoulders will miss the stop pin 62a, but the third or radially outermost stop shoulder 82 will engage the stop pin 62a.

An important feature of the mixing valve apparatus shown in FIGS. 10-13 is that although a threaded adjustable stop is employed to accomplish the adjustments, nevertheless those adjustments provide positive, discrete predetermined positions of adjustment for the valve piston 32a, which in turn produces discrete predetermined percentage mixtures of the primary and secondary fluids flowing through the valve 10a. Minor variations in the threaded positioning of the stop pin 62a from the indexed positions produce no variation whatsoever in the discrete predetermined stop positions of the valve piston 32a, and the only effect that threaded movement of the stop pin 62a can have on the stop positioning of the piston 32a is to adjust the stop position to one of the discrete positions defined by engagement of one of the stepped stop shoulders 82 against the stop pin 62a. Accordingly, the adjustable proportioning valve form 10a shown in FIGS. 10-13 produces the same results of providing discrete predetermined percentage fluid mixtures as the valve form 10 shown in FIGS. 1-9, but the adjustment of valve form 10a is accomplished by different means, and in particular by means which is externally accessible for making the adjustment.

Continuous engagement of inner end portion 98 of stop pin 62a in the shouldered recess 80 serves to locate piston 32a in a fixed position of rotation in valve body 12a wherein the secondary fluid inlet tubes 26a will register with the respective ports in piston stem 34a.

FIGS. 14-17 illustrate a third form of adjustable proportioning valve according to the present invention, this valve form being generally designated 10b, and like the form 10a shown in FIGS. 10-13 the adjustable proportioning valve 10b has adjusting means that is externally accessible. Also, like the valve form 10a of FIGS. 10-13, the valve form 10b of FIGS. 14-17 employs an adjustable stop pin that is mounted in the valve body and is selectively radially shiftable to a plurality of stop positions at which it is engaged by respective stepped stop shoulders on the valve piston. However, in the valve form 10b, the adjustable stop pin is mounted in an external wall portion of the valve body in an upstream part of the valve body between the inlet port and the secondary fluid inlet tubes, and the stepped stop shoulders are located on a downstream-directed extension of the piston head. Therefore, the following structures of the other two forms of the invention shown in FIGS. 1-9 and FIGS. 10-13, respectively, are not required in the third form of the invention shown in FIGS. 14-17: longitudinal slots 60 and 60a in the respective slide supports 24 and 24a; pin mounting holes 64 in piston stem 34 and longitudinal recess 80 with its stepped stop shoulders 82 in piston stem 34a; ports 66 and 66a in respective valve bodies 12 and 12a; and port cover 68 attached to valve body 12 and stop pin support structure 84 attached to valve body 12a.

The adjustable proportioning valve form 10b shown in FIGS. 14-17 includes valve body 12b which, except for the differences noted in the preceding paragraph, is generally similar to the valve bodies 10 and 10a of the other two illustrated forms of the invention. Valve body 12b thus includes inlet port 18b and outlet port 20b, and the body 12b defines a generally annular valve chamber 22b. Coaxially located within the valve body 12b is cylindrical piston slide support 24b which differs from slide supports 24 and 24a of the other two illustrated forms of the invention in that slide support 24b need not include slot 60 or 60a of the other two forms. Diametrically opposed secondary fluid inlet tubes 26b support the slide support 24b and provide communication with the inside of slide support 24b as in the other two illustrated forms of the invention.

Figures 14, 15:
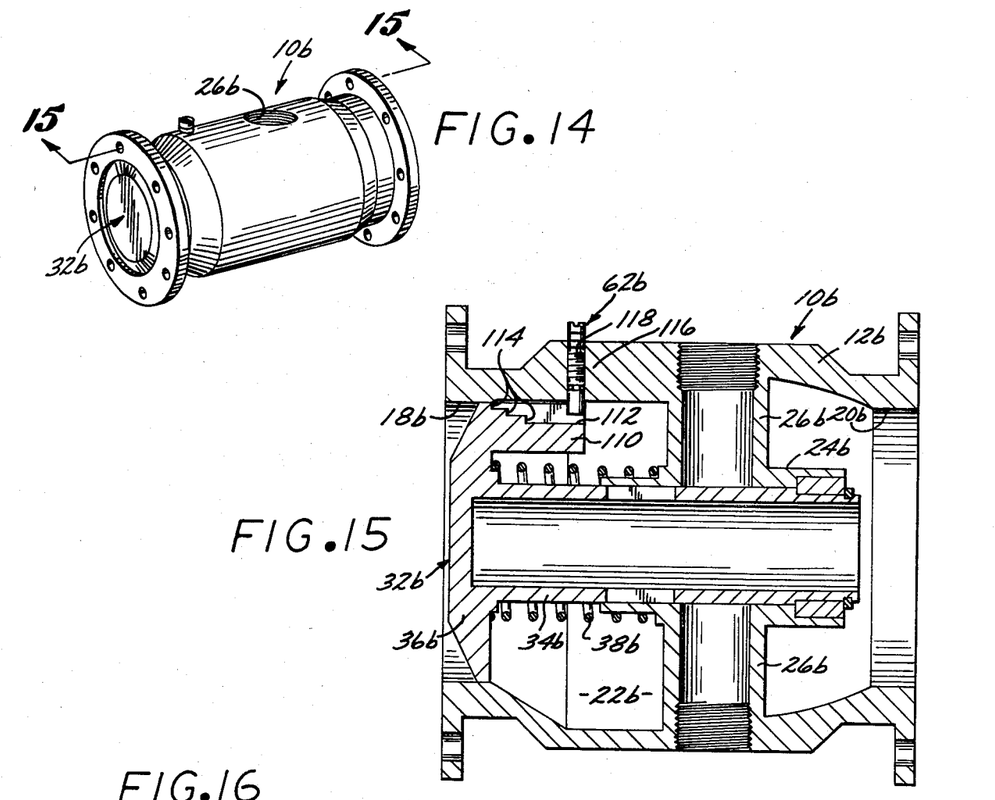
FIG. 14 is a perspective view similar to FIGS. 1 and 6, but showing a still further form of adjustable proportioning valve according to the invention.
FIG. 15 is an axial section taken on the line 15—15 in FIG. 14, showing the valve in its unactuated, closed position.
Figure 16:
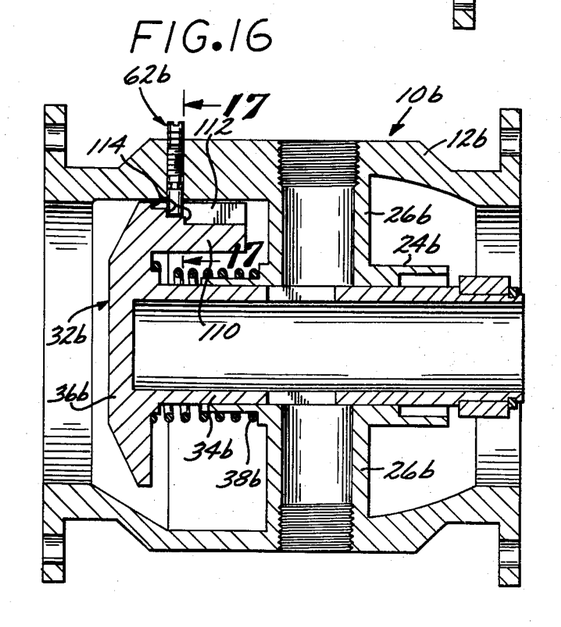
FIG. 16 is an axial sectional view similar to FIG. 15, but showing the valve in an actuated, open position.

Valve piston 32b is axially slidable in piston slide support 24b between a closed, upstream-most position as illustrated in FIG. 15 on the one hand, and a selected one of a plurality of open, downstream stop positions, an intermediate one of which is illustrated in FIG. 16. The valve piston 32b is stopped in its closed position of FIG. 15, is ported for mixing of two fluids, and is biased toward its closed position in the same manner as the pistons 32 and 32a of the other two illustrated forms of the invention.

The piston head 36b carries a web or projection 110 thereon that extends longitudinally downstream from the rear of piston head 36b. The web 110 has a radially outwardly facing longitudinal recess 112 therein, and within this longitudinal recess 112 is a series of stepped stop shoulders 114 which are similarly arranged as the series of stepped stop shoulders 82 in the form of the invention shown in FIGS. 10-13, except that they are on the outside of the web 110 that is mounted on piston head 36b, instead of being on the outside of the tubular piston stem.

Stop pin support structure 116 is formed on the inside of the outer wall of valve body 12b, and is in the form of a longitudinally arranged rib or web. This stop pin support rib or web 116 is preferably peripherally located in body 12b so as to be aligned longitudinally with one of the secondary fluid inlet tubes 26b, and may extend from an upstream location proximate the inlet port 18b downstream to a connection with the respective secondary fluid inlet tube 26b so as to minimize turbulence introduced into the primary fluid flow through the valve chamber 22b, and provide maximum strength for the stop pin support structure 116.

Stop pin support structure 116 has a radially oriented bore 118 extending therethrough, the bore 118 including an outer threaded portion 120 and an inner smooth sealing portion 122. Stop pin 62b is mounted in the bore 118, and includes an inner end portion 124 that is engaged in the longitudinal recess 112 of the piston web or projection 110 and is selectively engageable by the stepped stop shoulders 114. Stop pin 62b is generally similar to the stop pin 62a of the form of the invention shown in FIGS. 10–13, also including a sealing portion 126 having a sealing ring 126 thereon which is seated in the smooth sealing portion 122 of bore 118; a threaded portion 128 threadedly engaged in the outer threaded portion 120 of bore 118; an indexing portion 130 which carries a plurality of spaced indexing grooves or marks 132; and an outer end portion 134 which has a slot or other torquing means thereon adapted to receive a complementary driving tool for adjusting the radial position of the stop pin 62b.

Figure 17:
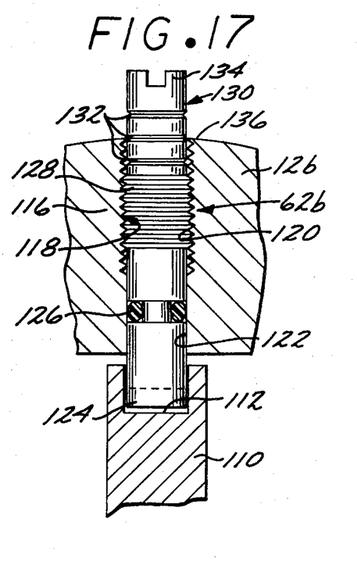
FIG. 17 is an enlarged, fragmentary sectional view taken on the line 17—17 in FIG. 16.

As with the adjustable stop pin 62a of the form of the invention shown in FIGS. 10–13, the adjustable stop pin 62b in the form shown in FIGS. 14–17 serves to locate the valve piston 32b at a fixed position of rotation in the valve body 12b wherein the secondary fluid inlet tubes 26b will register with the respective ports in the piston stem 34b; as well as serving the function of being adjustable to provide predetermined discrete stop positions for the valve piston 32b. The fixed position of rotation of the piston 32b in valve body 12b is maintained by the continuous engagement of the inner end portion 124 of stop pin 62b within the longitudinal recess 112 on the piston head web or projection 110, regardless of which stop position of the piston the adjustable stop pin 62b is adjusted to provide. The respective discrete predetermined stop positions of the valve piston 32b, which are three in number in the form of the invention shown in FIGS. 14–17, are selected by threadedly adjusting the stop pin 62b to its respective indexed positions where the respective indexing grooves or marks 132 on pin 62b are proximate the outer surface 136 of valve body 12b. As with the form of the invention shown in FIGS. 10–13, exact, discrete predetermined stop positions are achieved for the valve piston 32b regardless of minor variations in the adjustment positions of the stop pin 62b. In FIGS. 15–17, the adjustable stop pin 62b has been adjusted to the intermediate of its three positions of adjustment wherein the intermediate of the three indexing grooves or marks 132 lies proximate the valve body surface 136, and hence the intermediate of the three stop shoulders 114 engages against the pin 62b to determine the discrete stop position of the piston 32b.

While the present invention has been described with regard to particular embodiments, modifications may readily be made by those skilled in the art, and it is intended that the claims cover any such modifications which fall within the spirit and scope of the invention.

I claim:

1. A fluid proportioning valve which comprises:
a tubular body structure having a first fluid inlet for receiving a first fluid and a second fluid inlet for receiving a second fluid and having an outlet,
first fluid passage means in said body structure providing communication for passage of said first fluid from said first inlet to said outlet,
second fluid passage means in said body structure providing communication for passage of said second fluid from said second inlet to said outlet for mixing of said second fluid with said first fluid,
valve element structure movably mounted in said body structure for displacement from a first position blocking said second passage means to a second position at least partially clearing said second passage means, and
means engageable between said body and element structures adjustably limiting the extent of displacement of said element structure in said second position so as to adjust the proportion of said second fluid that is mixed with said first fluid,
said displacement limiting means comprising first and second stop means on the respective said structures which are in opposed, spaced-apart relationship in said first position of said element structure and are engageable against each other in said second position of said element structure, at least one of said stop means being adjustable,
said stop means on the respective said structures in said first position of said element structure having a plurality of discrete predetermined spacings therebetween that are respectively selectable by adjustment of said adjustable stop means to provide respective discrete predetermined displacements of said element structure in its said second position,
said adjustable stop means comprising pin means selectively movable to a plurality of discrete predetermined positions on its respective said structure.

2. A fluid proportioning valve as defined in claim 1, wherein said pin means is selectively engageable in any one of a plurality of spaced holes in its respective said structure.

3. A fluid proportioning valve as defined in claim 2, wherein said pin means is selectively threadedly engageable in each of said holes.

4. A fluid proportioning valve as defined in claim 1, which comprises slot means in the said structure other than the one on which said pin means is mounted, said pin means projection through said slot means.

5. A fluid proportioning valve as defined in claim 4, wherein a closed end of said slot means comprises the said stop means on said other structure.

6. A fluid proportioning valve as defined in claim 5, wherein said pin means is on said valve element structure.

7. A fluid proportioning valve as defined in claim 6 which comprises access port means in said body structure generally registering with said predetermined pin positions permitting movement of said pin means from one of said positions to another.

8. A fluid proportioning valve which comprises:
tubular body structure having a first fluid inlet for receiving a first fluid and a second fluid inlet for receiving a second fluid and having an outlet, first fluid passage means in said body structure providing communication for passage of said first fluid from said first inlet to said outlet, second fluid passage means in said body structure providing communication for passage of second fluid from said second inlet to said outlet for mixing of said second fluid with said first fluid, valve element structure movably mounted in said body structure for displacement from a first position blocking said second passage means to a second position at least partially clearing said second passage means, and means engageable between said body and element structures adjustably limiting the extent of displacement of said element structure in said second position so as to adjust the proportion of said second fluid that is mixed with said first fluid, said displacement limiting means comprising first and second stop means on the respective said structures which are in opposed, spaced-apart relationship in said first position of said element structure and are engageable against each other in said second position of said element structure, at least one of said stop means being adjustable, said stop means on the respective said structures in said first position of said element structure having a plurality of discrete predetermined spacings therebetween that are respectively selectable by adjustment of said adjustable stop means to provide respective discrete predetermined displacements of said element structure in its said second position, said valve element structure comprising a piston slidably mounted in said body structure for displacement in a direction generally from said first fluid inlet toward said outlet, said piston comprising a stem portion substantially blocking said second passage means in said first position and at least partially opening said second passage means in said second position.

9. A fluid proportioning valve as defined in claim 8, wherein said adjustable stop means is on said piston stem portion.

10. A fluid proportioning valve as defined in claim 8, wherein said adjustable stop means comprises pin means selectively movable to a plurality of discrete predetermined positions on said piston stem portion.

11. A fluid proportioning valve as defined in claim 10, wherein said pin means is selectively movable to a plurality of spaced holes in said piston stem portion.

12. A fluid proportioning valve as defined in claim 11, wherein said pin means is selectively threadedly engageable in each of said holes.

13. A fluid proportioning valve as defined in claim 10, wherein said body structure comprises tubular piston slide support means generally coaxially located therein within which said piston stem is slidably mounted, said slide support means having generally axially directed slot means therein through which said pin means projects.

14. A fluid proportioning valve as defined in claim 13, wherein a closed end of said slot means comprises the other said stop means.

15. A fluid proportioning valve as defined in claim 13, which comprises access port means in said body structure generally registering with said predetermined pin positions permitting movement of said pin means from one of said positions to another.

16. A fluid proportioning valve as defined in claim 8, wherein said adjustable stop means is on said body structure, and the other said stop means is on said piston.

17. A fluid proportioning valve as defined in claim 16, wherein the other said stop means is on said piston stem portion.

18. A fluid proportioning valve as defined in claim 16, wherein said piston comprises a head portion substantially blocking said first fluid inlet in said first position and at least partially opening said first fluid inlet in said second position, the other said stop means being on said piston head portion.

19. A fluid proportioning valve as defined in claim 16, wherein the other said stop means comprises a plurality of stepped shoulders selectively engageable by said adjustable stop means at respective different positions of adjustment of said adjustable stop means.

20. A fluid proportioning valve as defined in claim 19, wherein said adjustable stop means comprises pin means.

21. A fluid proportioning valve as defined in claim 20, wherein said pin means is adjustable by means of threaded engagement thereof with said body structure.

22. A fluid proportioning valve as defined in claim 21, wherein said pin means comprises an outer portion which is accessible from the outside of said body structure.

23. A fluid proportioning valve as defined in claim 22, wherein said pin means has indexing means thereon for visually indicating relative to said body structure which one of said shoulders will engage said pin means.

24. A fluid proportioning valve as defined in claim 22, wherein said outer portion of said pin means is protectively located in a recess in the outside of said body structure.

25. A fluid proportioning valve as defined in claim 19, wherein said stepped shoulders are located in generally axially oriented recess means in said piston, said adjustable stop means being engaged in said recess means in the positions of adjustment thereof for locating said piston in a fixed position of rotation in said body structure.

26. A fluid proportioning valve as defined in claim 19, wherein said stepped shoulders are on said piston stem portion.

27. A fluid proportioning valve as defined in claim 26, wherein said body structure comprises tubular piston slide support means generally coaxially located therein within which said piston stem is slidably mounted, said slide support means having aperture means therethrough, said adjustable stop means comprising pin means adjustably mounted on an outer portion of said body structure and extending through said aperture means into registry with said shoulders.

28. A fluid proportioning valve as defined in claim 27, wherein said body structure comprises pin support structure upon which said pin means is mounted and which is removably attached to said body structure.

29. A fluid proportioning valve as defined in claim 27, wherein said pin means extends through an outer wall portion of said body structure so as to be externally accessible.

30. A fluid proportioning valve as defined in claim 27, wherein said stepped shoulders are located in generally axially oriented recess means in said piston stem portion, said pin means being engaged in said recess means in the positions of adjustment thereof for locating said piston in a fixed position of rotation in said body structure.

31. A fluid proportioning valve as defined in claim 19, wherein said piston comprises a head portion substantially blocking said first fluid inlet in said first position and at least partially opening said first fluid inlet in said second position, said stepped shoulder being on said piston head portion.

32. A fluid proportioning valve as defined in claim 19, wherein said piston head portion comprises generally axially extending web means thereon upon which said shoulders are located.

33. A fluid proportioning valve as defined in claim 32, wherein said body structure comprises generally axially directed internal rib means forming support structure for said adjustable stop means.

34. A fluid proportioning valve as defined in claim 32, wherein said adjustable stop means comprises pin means extending through an outer wall portion of said body structure so as to be externally accessible.

35. A fluid proportioning valve as defined in claim 32, wherein said stepped shoulders are located in generally axially oriented recess means in said web means, said adjustable stop means being engaged in said recess means in the positions of adjustment thereof for locating said piston in a fixed position of rotation in said body structure.

36. A fluid proportioning valve as defined in claim 8, wherein said second fluid passage means comprises a passage portion in said body structure, said piston stem portion being tubular and opening toward said outlet, and aperture means extending through the wall of said tubular stem portion, said stem portion blocking said passage portion in said first position, and said aperture means at least partially registering with said passage portion in said second position.

37. A fluid proportioning valve as defined in claim 36, wherein said body structure comprises tubular piston slide support means generally coaxially located therein within which said piston stem portion is slidably mounted, said passage portion comprising tube means in said body structure opening at port means located at the inside of said tubular slide support means.

38. A fluid proportioning valve as defined in claim 37, wherein said tube means comprises a pair of generally diametrically opposed tubes.

39. A fluid proportioning valve as defined in claim 36, wherein said first fluid inlet comprises a valve seat, and said piston includes a head portion engageable in said seat in said first position.

40. A fluid proportioning valve as defined in claim 39, which further comprises a spring engaged between said slide support means and said piston biasing said piston toward said first position.

* * * * *